No. 609,468. Patented Aug. 23, 1898.
E. DE SALIGNAC.
COMBINATION SALT CELLAR AND PEPPER BOX.
(Application filed Nov. 10, 1897.)
(No Model.)
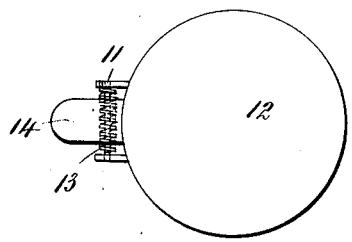
WITNESS
INVENTOR
Eugene de Salignac
BY
Edgar Tate & Co.
ATTORNEYS

UNITED STATES PATENT OFFICE.

EUGENE DE SALIGNAC, OF KEYPORT, NEW JERSEY.

COMBINATION SALT-CELLAR AND PEPPER-BOX.

SPECIFICATION forming part of Letters Patent No. 609,468, dated August 23, 1898.

Application filed November 10, 1897. Serial No. 658,052. (No model.)

*To all whom it may concern:*

Be it known that I, EUGENE DE SALIGNAC, a citizen of the United States, residing at Keyport, in the county of Monmouth and State of New Jersey, have invented certain new and useful Improvements in a Combination Salt-Cellar and Pepper-Box, of which the following is a full and complete specification, such as will enable those skilled in the art to which it appertains to make and use the same.

This invention relates to a combination salt-cellar and pepper-box; and the object thereof is to provide an improved device of this class which may be used both as a salt-cellar and pepper-box or for either of said purposes when desired.

The invention is fully disclosed in the following specification, of which the accompanying drawings form a part, in which—

Figure 1 is a central vertical section of my improved combination salt-cellar and pepper-box, and Fig. 2 a plan view thereof.

In the drawings forming part of this specification the separate parts of my improvement are designated by the same numerals of reference in each of the views, and in the practice of my invention I provide a device for the purpose herein set out which comprises a cylindrical casing 5, which may be composed of any desired material and which is provided with a central transverse partition 6.

Both ends of the casing 5 are open, and I also provide a device for closing each end of said casing which consists of a perforated plate 7, which is provided at one side of its perimeter with a flange or rim 8 and at the opposite side with a similar flange or rim 9.

The flange or rim 8 is screw-threaded on its outer surface, and the ends of the casing 5 are correspondingly screw-threaded, and the perforated plate 7 at each end is connected therewith by screwing the flanges 8 into the ends of the casing, as clearly shown in the drawings. The flanges or rims 9 are also screw-threaded on their outer surfaces, and mounted on each is a screw-threaded ring or band 10, to each of which is hinged, as shown at 11, an end plate 12.

Mounted on each of the hinge-pins at 11 is a spiral spring 13, and these hinges in each case operate to close the end plates 12, and each of said end plates is provided with a projection or thumb-piece 14, and by pressing thereon the end or cap plates 12 may be opened, so as to expose the perforated plate 7.

As thus constructed it will be seen that my improved salt-cellar and pepper-box is provided with two similar chambers 15, one of which is adapted to serve as a receptacle for salt and the other as a receptacle for pepper, and it will also be observed that each of the perforated plates 7 is removable, and the end or cap plates 12 are perfectly flat, so as to serve as a base or support for the device when resting on either end.

The operation will be readily understood from the foregoing description when taken in connection with the accompanying drawings and the following statement thereof: The salt is placed in one of the chambers 15 and the pepper in the other, and by depressing the handle 14, with which both of the end or cap plates 12 is provided, the corresponding end or cap plate will be opened against the operation of the corresponding spring 13, and the salt or pepper, as the case may be, may be sifted through the corresponding perforated plate 7. It will also be observed that the perforated plates 7 may be detached whenever desired by unscrewing the same and the parts connected therewith from the casing 5, and the end or cap plates 12 may be hinged directly to said perforated plates or to the flanges 9, and other changes in and modifications of the construction described may be made without departing from the spirit of my invention or sacrificing its advantages.

My improvement is simple in construction and operation and perfectly adapted to accomplish the result for which it is intended, and Having fully described my invention, I claim as new and desire to secure by Letters Patent—

1. A combination salt-cellar and pepper-box, consisting of a casing which is provided centrally with a transverse partition-plate, said casing being also provided at each end with a removable perforated plate which is provided on both sides of the perimeter thereof with a flange or rim, one of said flanges or rims serving as means for connecting said plate with the casing, and a hinged cap or end plate connected with the other flange or rim, said hinged cap or end plate being spring-operated, and provided adjacent to the spring with a thumb-piece, substantially as shown and described.

2. A combination salt-cellar and pepper-box, consisting of a casing which is provided with a partition the ends of said casing being screw-threaded interiorly, perforated plates having exteriorly-screw-threaded flanges extending on both sides of the same, one of said flanges screwing into the end of the casing, an interiorly-screw-threaded ring or band screwing upon the other flange of the perforated plate, and a spring-actuated hinged cover upon each of said rings or bands.

In testimony that I claim the foregoing as my invention I have signed my name, in presence of the subscribing witnesses, this 8th day of November, 1897.

EUGENE DE SALIGNAC.

Witnesses:
DAVE MORDECAI,
F. D. TOMS.